(12) United States Patent
Platania et al.

(10) Patent No.: US 8,575,889 B2
(45) Date of Patent: Nov. 5, 2013

(54) METHOD AND APPARATUS FOR CONTROLLING THE TRANSFER OF ELECTRIC POWER TO AN ELECTRONIC DEVICE SUPPLIED BY A BATTERY

(75) Inventors: Giuseppe Platania, Catania (IT); Jerome Nebon, Grenoble (FR); Patrizia Milazzo, S. Agata Li Battiati (IT); Alexandre Balmefrezol, Sassenage (FR)

(73) Assignees: STMicroelectronics S.r.l., Agrate Brianza (IT); STMicroelectronics S.A., Montrouge (FR)

( * ) Notice: Subject to any disclaimer, the term of this patent is extended or adjusted under 35 U.S.C. 154(b) by 596 days.

(21) Appl. No.: 12/200,510

(22) Filed: Aug. 28, 2008

(65) Prior Publication Data

US 2009/0058363 A1 Mar. 5, 2009

(30) Foreign Application Priority Data

Aug. 30, 2007 (EP) .................................. 07291047

(51) Int. Cl.
*H02J 7/00* (2006.01)
*H02J 7/04* (2006.01)

(52) U.S. Cl.
USPC ............................ 320/103; 320/140; 320/162

(58) Field of Classification Search
USPC .......................................... 320/103, 140, 162
See application file for complete search history.

(56) References Cited

U.S. PATENT DOCUMENTS 5,739,667 A 4/1998 Matsuda et al.
7,663,345 B2 * 2/2010 Ozawa et al. ................. 320/140
7,977,911 B2 * 7/2011 Maireanu et al. ............. 320/128
8,358,107 B2 * 1/2013 Nguyen ........................ 320/128
2007/0216378 A1 9/2007 Ozawa et al.

OTHER PUBLICATIONS

European Search Report dated Feb. 11, 2008 from European Patent Application No. 07291047.
Application Note 3607: Charging Batteries from USB; Internet Citation [online] Aug. 25, 2005, XP003014134, retrieved from the Internet: URL: http://www.maxim-ic.com/appnotes.cfm/appnote_number/3607_1.

* cited by examiner

*Primary Examiner* — Richard V Muralidar
(74) *Attorney, Agent, or Firm* — Wolf, Greenfield & Sacks, P.C.

(57) ABSTRACT

A DC-DC voltage down-converter for an electronic device supplied by a battery and having a bus interface for the interconnection with another electronic device capable of supplying electric power is provided. The DC-DC voltage down-converter includes a terminal coupled to a voltage supply line of the bus interface and operable to receive a input current from the another electronic device. The DC-DC voltage down-converter further includes an electric energy storage element coupled between the battery and the terminal, the electric energy storage element being operable to storage/release electric energy and a drive circuit arranged to control the storage/release of the electric energy storage element, so as to cause an electric power generated by the input current supplied by the another electronic device through the voltage supply line to re-charge the battery. The DC-DC voltage down-converter still further includes a input current feedback control circuit coupled to the terminal and arranged to monitor a value of the input current and generate a corresponding input current indication; the drive circuit configured to control the storage/release of the electric energy storage element according to the input current indication.

27 Claims, 3 Drawing Sheets

METHOD AND APPARATUS FOR CONTROLLING THE TRANSFER OF ELECTRIC POWER TO AN ELECTRONIC DEVICE SUPPLIED BY A BATTERY

CROSS REFERENCE TO RELATED APPLICATIONS

This application claims the priority benefit of European patent application number 07291047.4, filed on Aug. 30, 2007, entitled "Battery Charge Control Circuit," which is hereby incorporated by reference to the maximum extent allowable by law.

BACKGROUND OF THE INVENTION

1. Field of the Invention

The present invention relates generally to the field of electronics, and specifically to the aspects of battery charging, more particularly in relation to the use of the USB (Universal Serial Bus) interface for the charging of portable or mobile, battery-operated devices.

2. Discussion of the Related Art

In the last few years, portable and mobile, battery-operated digital electronic devices like mobile (cellular) phones, digital cameras, camcorders, PDAs (Personal Digital Assistants) have experienced a massive diffusion through users.

Mobile electronic devices use significant battery power; for example, the several different and more and more complex multimedia functions that are currently implemented by a mobile phone have a significant impact on the device's power consumption. Thus, the device battery should be re-charged as quickly and as often as possible.

Thanks to the success gained by the USB as a means for the connection of Personal Computers (PCs) to PC peripherals like printers, keyboards, pointing devices, memory card readers, pen drives, just to cite some, the producers of consumer electronics devices have been driven to equip also portable and mobile devices with USB interfaces. The presence of such USB interfaces may be advantageously exploited for charging the portable or mobile device battery in an alternative way with respect to the employment of AC/DC adapters.

More particularly, the battery of a portable or mobile device may be charged through the USB interface by exploiting the USB current and the USB voltage supply provided by whichever electronic device that is adapted to operate as a USB host (i.e., an electronic apparatus, like a PC, to which a USB device acting as a peripheral thereof can be connected), or by a USB wall adapter, for the connection to an AC-main socket.

Usually, USB hosts are capable of providing currents at most equal to 500 mA, while USB wall adapters may guarantee higher maximum currents, up to 1,5 A or more.

Since the USB voltage supply is a voltage in the range from approximately 4.85 V to approximately 5.25 V, and since battery-operated electronic devices are typically powered by a lithium (lithium ion or lithium polymer) battery, which provides a voltage in the range from approximately 3.0 V to approximately 4.2 V, a buck charger including a DC-DC voltage down-converter needs to be embedded in the battery-operated device.

DC-DC voltage down-converters are commonly of the switched-mode type. In this case, the down conversion of the USB voltage supply is carried out by applying a DC voltage across an inductor or transformer for a period of time which causes current to flow through it and store energy magnetically, then switching this voltage off and causing the stored energy to be transferred to the voltage output in a controlled manner.

In order to regulate the charge operations, it is possible to use one among the methods already known in the art. The known methods are all based on the monitoring of the current that is injected into the battery to be charged, i.e., the current that is provided by the DC-DC voltage down-converter to the battery. In particular, the known methods provide for monitoring and regulating the current comparing it with the maximum current that the USB host is able to deliver to the battery through the DC-DC voltage down-converter.

However, these methods present several drawbacks, that cause the charge of the battery to be slow and scarcely efficient.

Indeed, the current that is injected into the battery to be charged by the DC-DC voltage down-converter depends on the current provided by the USB host through a relationship that depends on the efficiency of the DC-DC voltage down-converter and the voltages of the input and output thereof; since the values of the quantities are not know a priori, by merely sensing the current that is injected into the battery it is not possible to estimate the value of the USB current in a precise way. The impossibility of estimating the USB current value may have detrimental effects on the performance of the charge operations.

In particular, since this solution does not allow regulating the USB current—whose value remains unknown—, it may happen that the battery is charged using a charging current that is significantly lower than the maximum USB current deliverable by the USB host.

A further drawback caused by the adoption of this solution regards the possibility of connecting more than one battery-operated device to be charged in parallel to the same USB host. Indeed, in this case, the sum of all the currents drained by the devices may exceed the maximum USB current that the USB host is capable of delivering, since the actual values of the currents drained by each device are not known.

Thus, the Applicant has found that by directly monitoring the current (generated by the USB host) that is injected into the DC-DC voltage down-converter it is possible to noticeably increase the performance of the charge operations.

SUMMARY OF THE INVENTION

It is an aim of embodiments of the present invention to at least partially address one or more of the needs in the prior art.

According to one aspect of the invention, there is provided a DC-DC voltage down-converter for an electronic device supplied by a battery and having a bus interface for interconnection with another electronic device capable of supplying electric power. The DC-DC voltage down-converter includes a terminal adapted to be coupled to a voltage supply line of the bus interface and operable to receive an input current from the another electronic device; an electric energy storage element coupled between the battery and the terminal, the electric energy storage element being operable to store/release electric energy; a drive circuit arranged to control the storage/release of the electric energy storage element so as to cause electric power generated by the input current supplied by the another electronic device through the voltage supply line to re-charge the battery; and an input current feedback control circuit coupled to the terminal and arranged to monitor a value of the input current and generate a corresponding input current indication related to the monitored value of the input current, wherein the drive circuit is configured to control the storage/release of the electric energy storage element according to the input current indication.

According to an embodiment of the invention, the electric power released by the energy storage element to re-charge the battery generates a corresponding battery current that is provided to the battery to re-charge it, and the DC-DC voltage down-converter further includes a battery current feedback control circuit coupled to the battery and arranged to monitor a value of the battery current and generate a corresponding battery current indication related to the monitored value of the battery current, wherein the drive circuit is configured to control the storage/release of the electric energy storage element also according to the battery current indication.

According to an embodiment of the invention, the electric power released by the energy storage element to re-charge the battery generates a corresponding battery voltage across the battery terminals, and the DC-DC voltage down-converter further includes a battery voltage feedback control circuit coupled to the battery and arranged to monitor a value of the battery voltage and generate a corresponding battery voltage indication related to the monitored value of the battery voltage, wherein the drive circuit is configured to control the storage/release of the electric energy storage element also according to the battery voltage indication.

According to an embodiment of the invention, wherein the drive circuit is configured to control the storage/release of the electric energy storage element by driving a switching circuit adapted to selectively connect/disconnect the energy storage element with the terminal depending on at least one of the input current indication, the battery current indication and the battery voltage indication.

According to an embodiment of the invention, the input current indication, battery current indication and battery voltage indication are pulse width modulated signals, whose duty cycles depend on the value of the monitored input current, battery current and battery voltage, respectively.

According to an embodiment of the invention, the duty cycle of the input current indication is substantially proportional to the value of the monitored input current; the duty cycle of the battery voltage indication is caused to increase if the value of the battery voltage is lower than a desired battery voltage value and is caused to decrease as the value of the battery voltage increases above the desired battery voltage value; and the duty cycle of the battery current indication is caused to increase if the value of the battery current is lower than a desired battery current value and is caused to decrease as the value of the battery current increases above the desired battery current value.

According to an embodiment of the invention, the DC-DC voltage down converter, further includes a logic circuit adapted to receive the input current indication, the battery current indication and the battery voltage indication and to provide a corresponding main indication to be provided to the drive circuit, the drive circuit being configured to drive the switching circuit for selectively connecting/disconnecting the energy storage element with the terminal according to the main indication.

According to an embodiment of the invention, the main indication is a pulse width modulated signal, the drive circuit being configured to drive the switching circuit for selectively connecting/disconnecting the energy storage element with the terminal according to the duty cycle of the main indication.

According to an embodiment of the invention, the logic circuit is a three-input AND logic gate, whose inputs are arranged to receive the input current indication, battery current indication and battery voltage indication, the logic circuit including an output that is arranged to provide the main indication.

According to an embodiment of the invention, the bus interface includes a Universal Serial Bus connector.

According to another aspect of the invention, there is provided a method for controlling the transfer of electric power to an electronic device supplied by a battery, the electric power being supplied by another electronic device adapted to be interconnected to the electronic device through a bus interface, the method comprising receiving a input current from the another electronic device through a voltage supply line of the bus interface; storing/releasing electric energy into/from an electric energy storage element; controlling the storage/release of the electric energy storage element, so as to cause electric power generated by the input current supplied by the another electronic device through the voltage supply line to re-charge the battery; monitoring a value of the input current; and generating a corresponding input current indication related to the monitored value of the input current, the storing/releasing electric energy into/from an electric energy storage element being carried out according to the input current indication.

BRIEF DESCRIPTION OF THE DRAWINGS

The features and advantages of the present invention will be best understood by reading the following detailed description of an exemplary and non-limitative embodiment thereof description that will be made in conjunction with the attached drawings, wherein.

DETAILED DESCRIPTION

Figure 1:
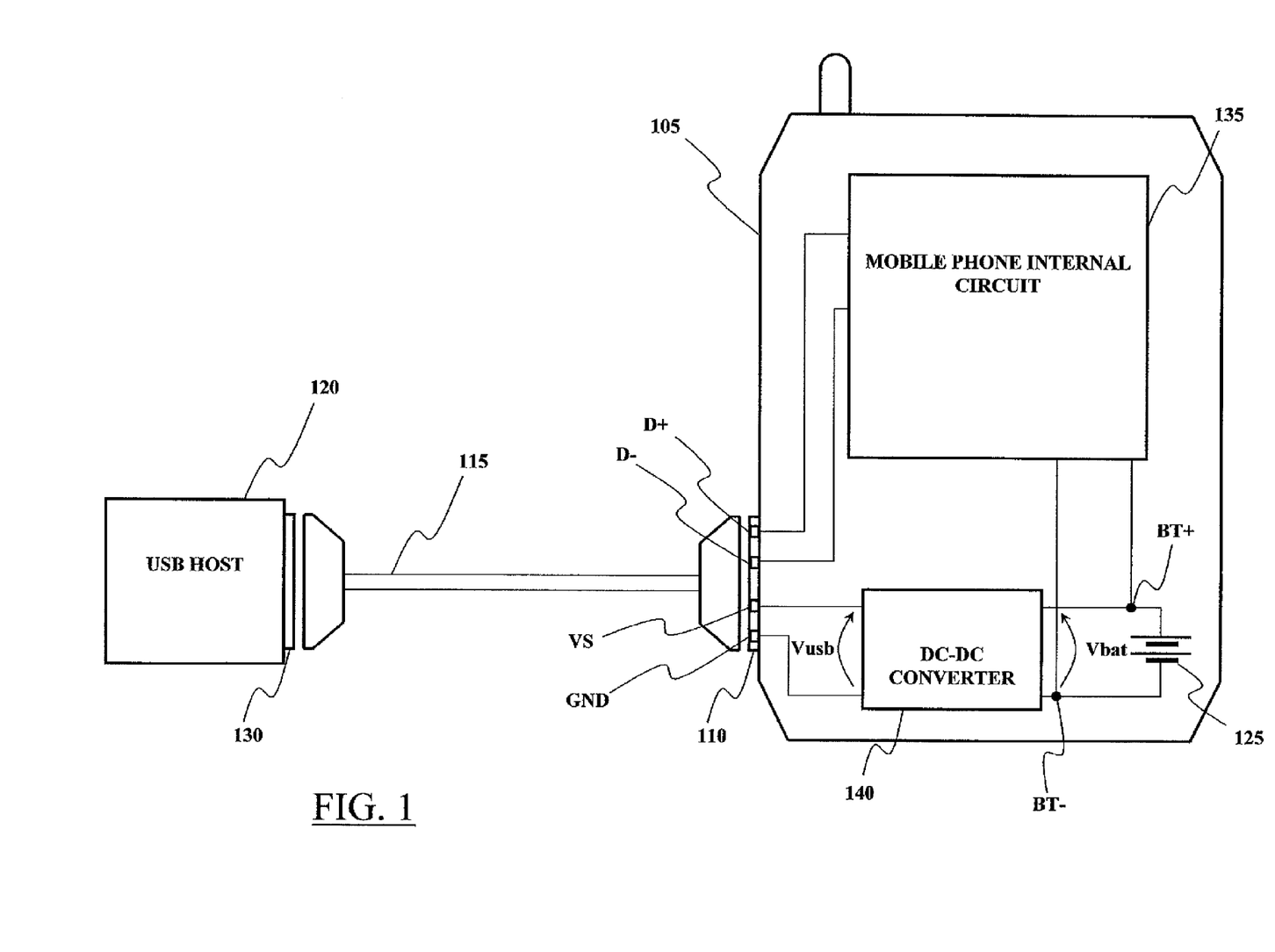
FIG. 1 schematically shows a battery-operated device including a USB interface, wherein a DC-DC converter according to an embodiment of the present invention can be usefully applied.

Referring to the drawings, FIG. 1 depicts an exemplary scenario where an embodiment of the present is advantageously exploited.

Reference numeral 105 denotes a battery-operated device, particularly a portable or mobile device, for example a mobile or cellular phone 105; for instance, albeit not limitatively, the mobile phone 105 may be a second-generation or 2G mobile phone (for example a GSM—Global System for Mobile communications— or GPRS—General Packet Radio System— or EDGE—Enhanced Data rate for GSM Evolution) or a third-generation or 3G mobile phone (for example a UMTS—Universal Mobile Telecommunications Standard). The mobile phone 105 may, as nowadays common, implement several multimedia functions in addition to pure mobile phone functions, for example one or more among MMS (Multimedia Messaging Service) functions, digital still camera functions, camcorder functions, functions of receiver of DVB-H television signals (Digital Video Broadcasting—Handheld).

The mobile phone 105 is provided with a USB interface including a USB connector 110 for the connection to a USB cable 115, and an internal USB driver, for handling the communications with other devices through the USB bus. Through the USB connector 110, the mobile phone 105 can be connected to a USB host 120, for charging a battery 125 of the mobile phone 105. The USB host 120 shown in the figure may be, for example a PC, which is provided with a USB interface including a USB connector 130. It should be noted that the concepts of the present invention are also applicable in case the USB host 120 is replaced by a USB battery charger, for example, a charger that can be plugged into the AC mains and that includes an AC/DC converter and a USB interface.

The USB connector 110 comprises four terminals, namely a voltage supply terminal VS, a reference potential or ground terminal GND, and a pair of differential-voltage data terminals D+ and D−.

When the mobile phone 105 is connected—through the USB connector 110—to the USB host 120, it receives between the voltage supply terminal VS and the ground terminal GND a USB voltage Vusb (nominally, 5 V +/−0.25 V) provided by the USB host 120.

The differential-voltage data terminals D+ and D− are connected to a mobile phone internal circuitry 135, which is intended to include all the electronic circuits of the mobile phone except for the power management circuits; in particular, the mobile phone internal circuitry 135 is intended to include the circuits enabling the mobile phone 105 to exchange data with other electronic devices over the USB bus, particularly a USB controller.

The battery 125 provides the electrical energy for the mobile phone operation; in particular, the battery 125 supplies electrical energy to the internal circuitry 135 through a positive terminal BT+ and a negative terminal BT− of the battery 125. The battery 125 may for example be a lithium battery, particularly a lithium-ion or a lithium-polymer battery, adapted to supply electrical energy at a battery voltage Vbat between the positive terminal BT+ and the negative terminal BT− in the range from approximately 3.0 V to approximately 4.2 V. It is intended that the specific type of battery is not limitative to the present invention.

The mobile phone 105 further includes a DC-DC converter unit 140 designed to perform a function of down-converting the USB voltage Vusb to the battery voltage Vbat. In this way, the DC-DC converter unit 140 allows the battery 125 of the mobile phone 105 to be re-charged whenever the mobile phone is connected, via the USB connector 110, to the USB host 120.

Figure 2:
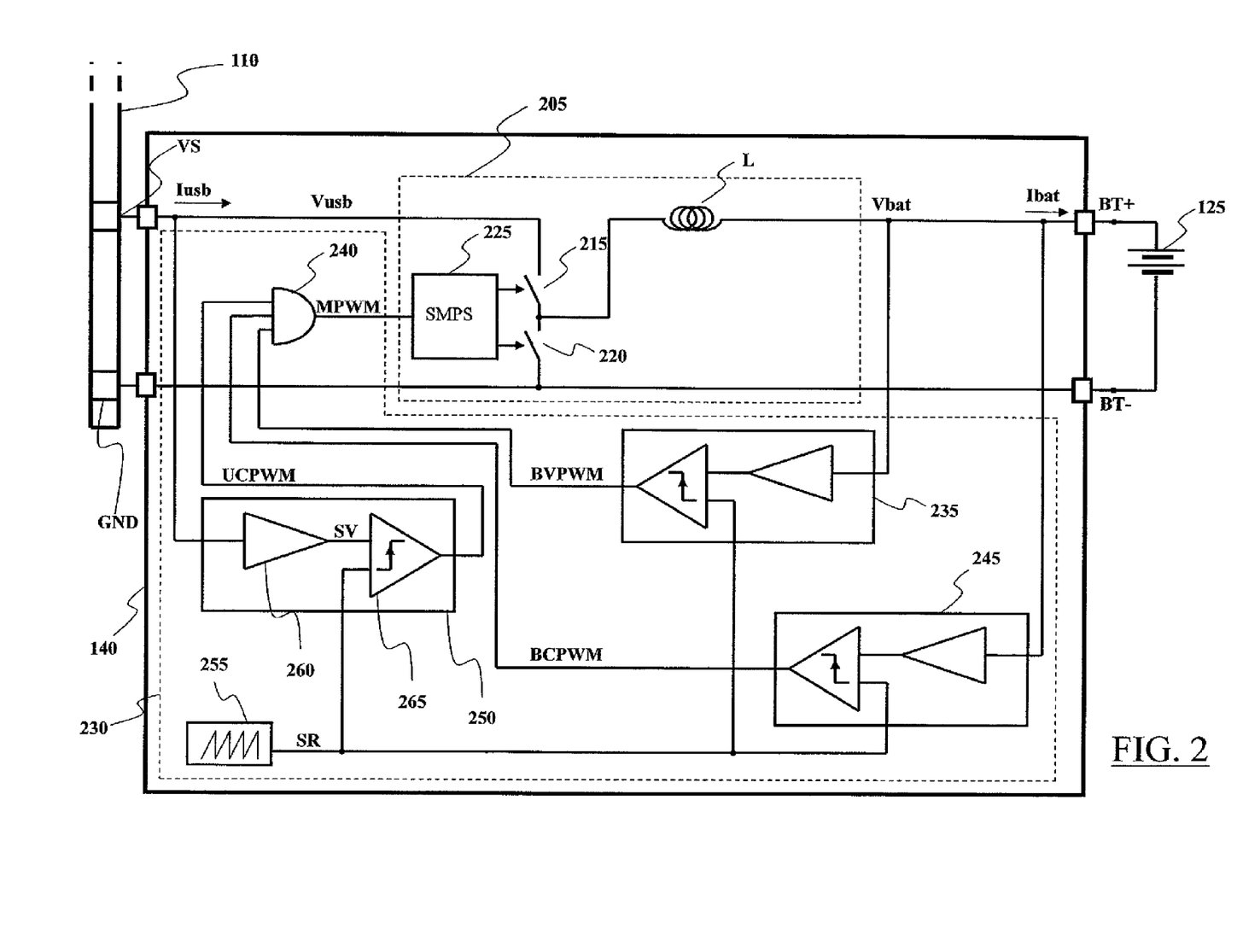
FIG. 2 schematically shows a DC-DC converter according to an embodiment of the present invention.

FIG. 2 schematically shows a block diagram of the DC-DC converter unit 140 according to an embodiment of the present invention.

More particularly, the DC-DC converter unit 140 comprises a DC-DC conversion circuit 205, having the purpose of performing the operations directed to down-convert the USB voltage Vusb.

The DC-DC conversion circuit 205 includes a first electronic switch 215, for example, a transistor (e.g., a power transistor), coupled between the voltage supply terminal VS and a first terminal of an inductor L; a second terminal of the inductor L is coupled to the positive terminal BT+.

The first terminal of the inductor L is also coupled to a first terminal of a second electronic switch 220, for example, a transistor (e.g., a power transistor), having a second terminal coupled to the negative terminal BT−; the second terminal of the second electronic switch 220 (and, thus, the negative terminal BT−) is also coupled to the ground terminal GND.

The DC-DC conversion circuit 205 further includes a Switched-Mode Power Supply (SMPS) driving circuit 225, which is adapted to drive the opening/closure of the first or second switches 215, 220 with Pulse Width Modulated (PWM) drive signals, in such a way to enable the transfer of energy from the voltage supply terminal VS to the battery 125 through the inductor L. For example, according to an embodiment of the present invention, the SMPS driving circuit 225 receives a main PWM drive signal MPWM, and accordingly drives the first and second switches 215, 220 with essentially complementary versions of a signal corresponding to the main PWM drive signal MPWM; particularly, when the main PWM drive signal MPWM is at the "high" value, the first switch 215 is closed (i.e., the voltage supply terminal VS is coupled to the first terminal of the inductor L) and the second switch 220 is open, while, when the main PWM drive signal MPWM is at the "low" value, the first switch 215 is open and the second switch 220 is closed (i.e., the first terminal of the inductor L is coupled to ground terminal GND).

By varying the duty cycle of the main PWM drive signal MPWM, it is 1s possible to vary the charge and discharge time of the inductor L; particularly, the higher the duty cycle of the main PWM drive signal MPWM, the higher the quantity of energy that is transferred from the supply terminal VS to the battery 125. As a consequence, by varying the duty cycle of the main PWM drive signal MPWM, the ratio of the (input) USB voltage Vusb to the (output) battery voltage Vbat can be regulated.

The DC-DC converter unit 140 further includes a control circuit 230, whose purpose is to manage the operations performed by the DC-DC conversion circuit 205. As will be described in detail, the control circuit 230 forms a feedback network that monitors several electrical quantities managed/generated by the DC-DC conversion circuit 205, and consequently adjust the duty cycle of the main PWM drive signal MPWM appropriately, to maintain constant and stable the quantities.

More particularly, the control circuit 230 includes a plurality of feedback networks, each one directed to monitor a corresponding electrical quantity managed or generated by the DC-DC conversion circuit 205.

A first feedback network, which has the purpose of monitoring the value of the battery voltage Vbat, comprises a first sensing and comparing circuit block 235 having a first input coupled to the positive terminal BT+ for sensing the battery voltage Vbat, a second input for receiving a periodic saw-tooth reference signal SR, and an output terminal for providing a battery voltage PWM signal BVPWM to a first input of a logic circuit 240.

A second feedback network, which has the purpose of monitoring the value of a battery current Ibat flowing from the inductor L to the positive terminal BT+ for charging the battery 125, comprises a second sensing and comparing circuit block 245 having a first input coupled to the positive terminal BT+ for sensing the battery current Ibat, a second input for receiving the saw-tooth reference signal SR, and an output terminal for providing a battery current PWM signal BCPWM to a second input of the logic circuit 240.

According to an embodiment of the present invention, the control circuit 230 includes a third feedback network, which has the purpose of monitoring the value of a USB current Iusb flowing from the voltage supply terminal VS to the DC-DC converter unit 140. The third feedback network comprises a third sensing and comparing circuit block 250 having a first input coupled to the voltage supply terminal VS for sensing the USB current Iusb, a second input for receiving the saw-tooth reference signal SR, and an output terminal for providing a USB current PWM signal UCPWM, to a third input of the logic circuit 240.

The control circuit 230 further includes a reference signal generator circuit 255, which is adapted to generate the saw-tooth reference signal SR to be provided to the second input terminals of the sensing and comparing circuits 235, 245, 250. According to an embodiment of the present invention, the saw-tooth reference signal SR is a voltage signal that increases its value—starting from the voltage assumed by the ground terminal GND (the ground voltage)—with a constant rate for the duration of the entire period, and then rapidly fall back toward the ground voltage at the end of each period.

The logic circuit 240 includes an output terminal that is connected to an input terminal of the SMPS driving circuit 225 for providing the main PWM drive signal MPWM thereto according to the PWM drive signals received at its inputs. According to an embodiment of the present invention, the logic circuit 240 is a three-input AND logic gate.

According to an embodiment of the present invention, the sensing and comparing circuits 235, 245, 250 have substantially the same circuit structure; consequently, only one of them, and namely the sensing and comparing circuit 250 will be described in greater detail. Naturally, the concepts of the present invention will be also applicable in case the sensing and comparing circuits 235, 245, 250 have different but equivalent circuit structures.

The purpose of the sensing and comparing circuit 250 is to set the duty cycle of the USB current PWM signal UCPWM according to the value of the USB current Isub. For this purpose, the sensing and comparing circuit 250 includes a sensing circuit, identified in the figure with the reference 260, and a comparator circuit, identified in the figure with the reference 265. The sensing circuit 260 has an input connected to the first input of the sensing and comparing circuit 250 for sensing the USB current Iusb, and an output for providing a sensed voltage SV—corresponding (for example, being proportional) to the sensed value of the USB current Iusb—to a first input of the comparator circuit 265. The comparator circuit 265 has a second input connected to the second input of the sensing and comparing circuit 250 for receiving the saw-tooth reference signal SR and an output terminal for providing the USB current PWM signal UCPWM. The duty cycle of the USB current PWM signal UCPWM (i.e., the ratio between the width of a pulse of the signal and the duration of a period thereof is determined by the value assumed by the sensed voltage SV; indeed, the higher the sensed voltage SV, the later the value of the saw-tooth reference signal SR reaches the sensed voltage SV within each period of the saw-tooth reference signal SR, and the later the comparator circuit 265 switches. Consequently, the higher the sensed voltage SV (i.e., the higher the USB current Iusb), the higher the duty cycle of the USB current PWM signal UCPWM.

The detailed circuit structure of the sensing circuit 260 will not be described in detail, and it is underlined that whichever current sensing circuit type may be advantageously used for sensing the USB current Iusb. Similar considerations may be applied to the circuit structure of the comparator circuit 265.

As previously mentioned, the sensing and comparing circuits 235, 245 will be only described in terms of their function, since their circuit structures are substantially equivalent to the structure of the sensing and comparing circuit 250.

More particularly, the sensing and comparing circuit 245 has the purpose of guaranteeing that, in an initial phase of the charge process, the battery 125 is charged with a proper constant battery current Ibat. For this purpose, the more the value of the battery current Ibat departs from the desired constant current (i.e., the lower the value of Ibat with respect to the desired current), the more the duty cycle of the battery current PWM signal BCPWM generated by the sensing and comparing circuit 245 is increased, in such a way to increase the value of the battery current Ibat.

The sensing and comparing circuit 235 has instead the purpose of guaranteeing that, in a second phase of the charge process, the charge of the battery 125 is carried out at a desired constant battery voltage Vbat. For this purpose, the more the value of the battery voltage Vbat departs from the desired battery voltage Vbat (i.e., the lower the value of Vbat with respect to the desired voltage), the more the duty cycle of the battery voltage PWM signal BVPWM generated by the sensing and comparing circuit 235 is increased, in such a way to increase the value of the battery voltage Vbat.

Figure 3A:
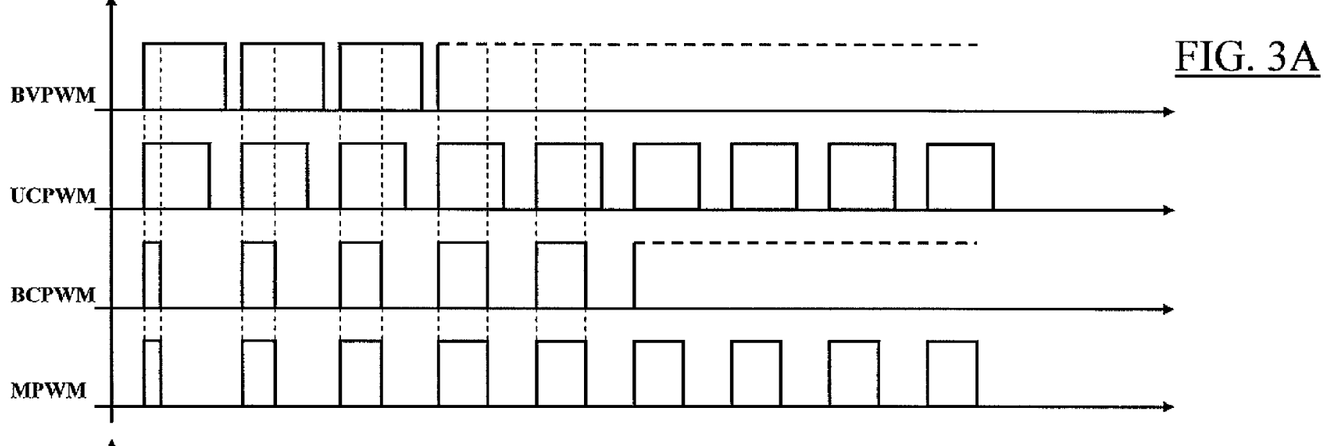
FIGS. 3A and 3B show two examples of how several signals managed by the DC-DC converter unit of FIG. 2 evolve in time.
Figure 3B:
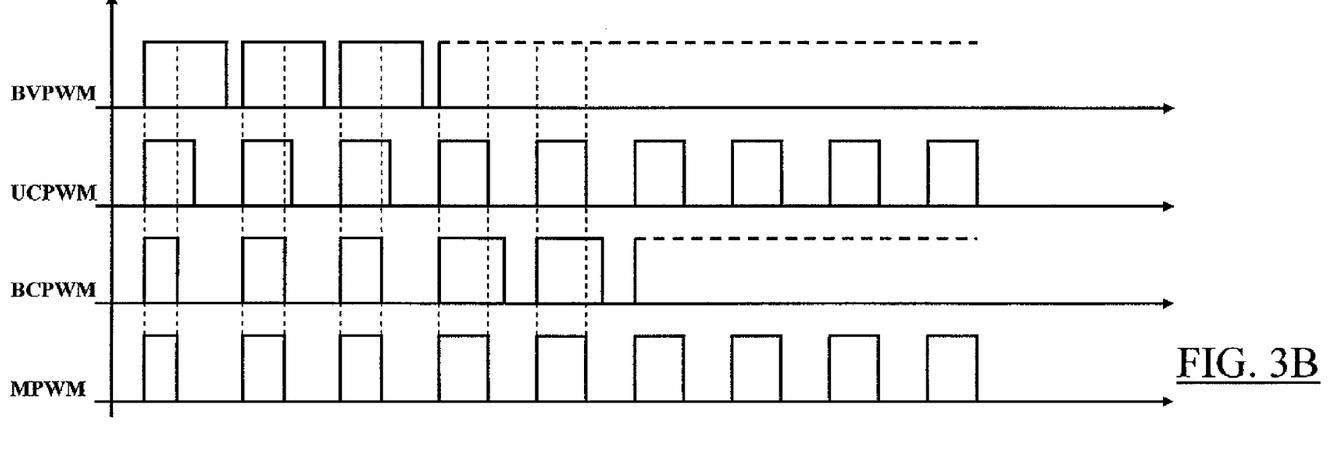

In order to describe how the DC-DC converter unit 140 operates for down-converting the USB voltage Vusb to the battery voltage Vbat, reference will be now made also to FIGS. 3A and 3B, which show two examples of how the PWM signals managed by the DC-DC converter unit 140 evolve in time.

During the operation of the DC-DC converter unit 140, the logic circuit 240 receives at its inputs the battery voltage PWM signal BVPWM, the battery current PWM signal BCPWM and the USB current PWM signal UCPWM; the duty cycle of each PWM signal depends on the value assumed by the electrical quantity that is monitored by the corresponding feedback network. More particularly:
- the duty cycle of the battery current PWM signal BCPWM is caused to increase if the value of the battery current Ibat is lower than a desired battery current; furthermore, the duty cycle of the battery current PWM signal BCPWM is caused to decrease as the value of the battery current Ibat increases above the desired battery current. In the initial phase of the battery charge process, the duty cycle of the battery current PWM signal BCPWM is such that the charge current is essentially constant at the desired value;
- the duty cycle of the battery voltage PWM signal BVPWM is caused to increase if the value of the battery voltage Vbat is lower than a desired battery voltage; furthermore, the duty cycle of the battery voltage PWM signal BVPWM is caused to decrease as the value of the battery voltage Vbat increases above the desired battery voltage. In the second phase of the battery charge process, the duty cycle of the battery voltage PWM signal BVPWM is such that the charge current is essentially constant at the desired value;
- the duty cycle of the USB current PWM signal UCPWM is caused to be substantially proportional to the USB current Iusb value, and, in case the available USB current is low, it may limit the duty cycle of the main PWM drive signal MPWM below that set by the battery voltage PWM signal BVPWM or the battery current PWM signal BCPWM.

Since the main PWM drive signal MPWM provided by the logic circuit 240 is generated by performing a logic AND operation among the three PWM signals BVPWM, BCPWM and UCPWM, and since the three signals are generated starting form the same saw-tooth reference signal SR, at each period of the latter signal, the main PWM drive signal MPWM, particularly its duty cycle, corresponds to the PWM signal that has the lowest duty cycle. In other words, the one of the three PWM signals BVPWM, BCPWM and UCPWM having the lowest duty cycle prevails and dictates which has to be the duty cycle of the main PWM drive signal MPWM.

In this way, both in the initial phase and in the second phase of the charge process, the transfer of energy from the voltage supply terminal VS to the battery 125 through the inductor L is regulated taking into account the available USB current Iusb.

The example shown in FIG. 3A corresponds to a case in which the value of the USB current Iusb provided by the USB host 120 is sufficiently high to guarantee that the battery 125 is charged with the desired battery current Ibat. Indeed, it can be appreciated that in this case the pulses of the main PWM drive signal MPWM constantly correspond to the pulses of the battery current PWM signal BCPWM, since the duty cycle of the latter PWM signal is the lowest among the PWM signals received by the logic circuit 240.

This means that, during the initial phase of the battery charge, the transfer of energy from the voltage supply terminal VS to the battery 125 is carried out based on the value the battery current Ibat assumes: as long as its value is lower than the desired value, the second feedback network reacts in such a way that the duty cycle of the battery current PWM signal BCPWM is progressively increased; thus, also the battery current Ibat is progressively increased. This situation occurs until the battery current Ibat has reached the desired value (in the example illustrated in FIG. 3A this occurs at the fourth pulse of the main PWM drive signal MPWM).

Conversely, in the example shown in FIG. 3B, the value of the USB current Iusb provided by the USB host 120 is not sufficient to guarantee that the battery 125 is charged with the desired battery current Ibat. Indeed, in this example, while the three first pulses of the main PWM drive signal MPWM correspond to the pulses of the battery current PWM signal BCPWM, the following ones correspond to the USB current PWM signal UCPWM, which is became the PWM signal having the lowest duty cycle.

This means that during the initial phase of the battery charge, the transfer of energy from the voltage supply terminal VS to the battery 125 is again carried out based on the value the battery current Ibat assumes: as long as its value is lower than the desired value, the second feedback network reacts in such a way that the duty cycle of the battery current PWM signal BCPWM is progressively increased—and, thus, also the battery current Ibat is progressively increased. However, according to the example, at the fourth pulse, the value of the USB current Iusb corresponding to the battery current Ibat becomes higher than the maximum current that the USB host 120 is capable of providing (i.e., the highest current that can be drained from the voltage supply terminal VS): once the current level has been reached, the control passes to the third feedback circuit, since the USB current PWM signal UCPWM becomes the PWM signal with the lowest duty cycle. Indeed, in this condition, the duty cycle of the battery current PWM signal BCPWM exceeds the duty cycle of the USB current PWM signal UCPWM, since the increase of the battery current Ibat can not be followed by a corresponding increase of the USB current Iusb, which has reached its maximum value.

In other words, thanks to the presence of a feedback network adapted to monitor the USB current Iusb, it is possible to know its value; the knowledge of the value can be advantageously exploited for accordingly regulating the battery charge operation. Consequently, it is avoided that the battery 125 is charged with a battery current Ibat that is significantly lower than the maximum USB current that the USB host 120 is capable of providing. Moreover, in case other USB peripherals (e.g., other mobile devices) are connected to the USB host 120 for being charged, the presence of the feedback network for monitoring the USB current Iusb allows to automatically reduce the value of the battery current Ibat in case the sum of the currents drained from the USB host 120 by all the USB peripherals connected thereto exceeds the maximum USB current that the USB host 120 is capable of providing.

Naturally, in order to satisfy local and specific requirements, a person skilled in the art may apply to the solution described above many logical and/or physical modifications and alterations. More specifically, although the present invention has been described with a certain degree of particularity with reference to preferred embodiment(s) thereof, it should be understood that various omissions, substitutions and changes in the form and details as well as other embodiments are possible. Particularly, the proposed solution may even be practiced without the specific details set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

In particular, although reference has been explicitly made to a mobile phone, the present invention can be advantageously used in any battery-operated electronic device, like for example smart phones, PDAs, digital still cameras, camcorders.

Moreover, similar considerations apply if the AND logic gate is replaced by a different, but equivalent, logic circuit.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A DC-DC voltage down-converter for a first electronic device, the first electronic device supplied by a battery and having a bus interface for interconnection with a second electronic device capable of supplying electric power, the DC-DC voltage down-converter including:
    a terminal adapted to be coupled to a voltage supply line of the bus interface and operable to receive an input current from the second electronic device;
    an electric energy storage element coupled between the battery and the terminal, the electric energy storage element being operable to store/release electric energy;
    an input current feedback control circuit coupled to the terminal and arranged to monitor a value of the input current and generate a corresponding input current indication related to the value of the input current; and
    a drive circuit arranged to increase a rate of energy transfer from the voltage supply line to the electric energy storage element when the value of the input current increases, by controlling the storage/release of the electric energy storage element according to the input current indication, so as to cause electric power generated by the input current supplied by the second electronic device through the voltage supply line to re-charge the battery.

2. The DC-DC voltage down-converter of claim 1, wherein:
    the electric energy released by the electric energy storage element to re-charge the battery generates a corresponding battery current that is provided to the battery to re-charge the battery,
    the DC-DC voltage down-converter further includes a battery current feedback control circuit coupled to the battery and arranged to monitor a value of the battery current and generate a corresponding battery current indication related to the value of the battery current, and the drive circuit is further configured to control the rate of energy transfer from the voltage supply line to the electric energy storage element by controlling the storage/release of the electric energy storage element according to the battery current indication.

3. The DC-DC voltage down-converter of claim 2, wherein the terminal is a first terminal, and wherein:

the electric energy released by the electric energy storage element to re-charge the battery generates a corresponding battery voltage across second terminals of the battery, the DC-DC voltage down-converter further includes a battery voltage feedback control circuit coupled to the battery and arranged to monitor a value of the battery voltage and generate a corresponding battery voltage indication related to the value of the battery voltage, and the drive circuit is further configured to control the rate of energy transfer from the voltage supply line to the electric energy storage element by controlling the storage/release of the electric energy storage element according to the battery voltage indication.

4. The DC-DC voltage down-converter of claim 3, wherein the drive circuit is configured to control the storage/release of the electric energy storage element by driving a switching circuit adapted to selectively connect/disconnect the energy storage element to/from the first terminal depending on at least one indication selected from the group consisting of the input current indication, the battery current indication, and the battery voltage indication.

5. The DC-DC voltage down-converter of claim 4, wherein the battery current indication and the battery voltage indication are pulse width modulated signals, whose duty cycles depend on the values of the battery current and the battery voltage, respectively, and wherein the input current indication is a pulse width modulated signal whose duty cycle depends on the value of the input current.

6. The DC-DC voltage down converter of claim 5, wherein:

the battery voltage feedback control circuit is configured to increase the duty cycle of the battery voltage indication if the value of the battery voltage is lower than a threshold battery voltage value and to decrease the duty cycle of the battery voltage indication as the value of the battery voltage increases above the threshold battery voltage value; and the battery current feedback control circuit is configured to increase the duty cycle of the battery current indication if the value of the battery current is lower than a threshold battery current value and to decrease the duty cycle of the battery current indication as the value of the battery current increases above the desired threshold current value.

7. The DC-DC voltage down converter of claim 6, further including a logic circuit adapted to receive the input current indication, the battery current indication and the battery voltage indication and to provide a corresponding main indication to the drive circuit, the drive circuit being configured to drive the switching circuit for selectively connecting/disconnecting the electric energy storage element to/from the first terminal according to the main indication.

8. The DC-DC voltage down converter of claim 7, wherein the main indication is a pulse width modulated signal, the drive circuit being configured to drive the switching circuit for selectively connecting/disconnecting the energy storage element to/from the first terminal according to the duty cycle of the main indication.

9. The DC-DC voltage down converter of claim 8, wherein the logic circuit is a three-input AND logic gate, whose inputs are arranged to receive the input current indication, the battery current indication and the battery voltage indication, the logic circuit including an output that is arranged to provide the main indication.

10. The DC-DC voltage down-converter of claim 4, wherein a load circuit of the first electronic device and the battery of the first electronic device are coupled to the terminal through the switching circuit.

11. The DC-DC voltage down-converter of claim 5, wherein the duty cycle of the pulse-width modulated signal is directly proportional to the value of the input current.

12. The DC-DC voltage down converter of claim 1, wherein the bus interface includes a Universal Serial Bus connector.

13. The DC-DC voltage down-converter of claim 1, wherein controlling the storage/release of the electric energy storage element according to the input current indication includes increasing a charge time of the electric energy storage element, relative to a discharge time of the electric energy storage element, when the value of the input current increases.

14. A method for controlling a transfer of electric power to a first electronic device supplied by a battery, the electric power being supplied by a second electronic device adapted to be interconnected to the first electronic device through a bus interface, the method comprising:

receiving an input current from the second electronic device through a voltage supply line of the bus interface;

storing/releasing electric energy into/from an electric energy storage element ;

monitoring a value of the input current and generating a corresponding input current indication related to the value of the input current; and controlling the storage/release of the electric energy storage element according to the input current indication, so as to cause an electric power generated by the input current supplied by the second electronic device through the voltage supply line to re-charge the battery, wherein controlling the storage/release of the electric energy storage element according to the input current indication comprises increasing a rate of energy transfer from the voltage supply line to the electric energy storage element when the value of the input current increases.

15. The method of claim 14, wherein controlling the storage/release of the electric energy storage element according to the input current indication comprises controlling the storage/release of the electric energy storage element at a first time, and wherein the method further comprises:

monitoring a value of a current of the battery and generating a corresponding battery current indication related to the value of the battery current, the battery current indication being a pulse width modulated signal, a duty cycle of the battery current indication depending on the value of the battery current, and controlling, at a second time, the storage/release of the electric energy storage element according to the battery current indication, wherein the duty cycle of the battery current indication increases if the value of the battery current is lower than a threshold battery current value.

16. The method of claim 14, wherein increasing the rate of energy transfer from the voltage supply line to the electric energy storage element comprises increasing a charge time of the electric energy storage element, relative to a discharge time of the electric energy storage element.

17. A DC-DC voltage down-converter for a first electronic device, the first electronic device supplied by a battery and having a bus interface for the interconnection with a second electronic device capable of supplying electric power, the DC-DC voltage down-converter including:
a terminal operable to receive an input current from the second electronic device through a voltage supply line of the bus interface;
an electric energy storage element coupled between the battery and the terminal, and operable to store/release electric energy; and
a means for controlling the storage/release of the electric energy into/from the electric energy storage element, wherein controlling the storage/release comprises controlling the storage/release according to a value of the input current by increasing a rate of transfer of the electric energy from the voltage supply line to the electric energy storage element when the value of the input current increases.

18. The DC-DC voltage down converter of claim 17, wherein the first electronic device is a portable electronic device.

19. The DC-DC voltage down-converter of claim 17, further comprising a battery current feedback control circuit coupled to the battery and arranged to monitor a value of a current of the battery, wherein controlling the storage/release of the electric energy according to the value of the input current comprises controlling the storage/release of the electric energy at a first time, wherein controlling the storage/release of the electric energy further comprises controlling, at a second time, the storage/release of the electric energy according to a value of the battery current by increasing a rate of transfer of the electric energy from the voltage supply line to the electric energy storage element if the value of the battery current is lower than a threshold battery current value.

20. The DC-DC voltage down-converter of claim 17, wherein increasing the rate of transfer of the electric energy from the voltage supply line to the electric energy storage element comprises increasing a charge time of the electric energy storage element, relative to a discharge time of the electric energy storage element.

21. A method for controlling a transfer of electric power to a first electronic device supplied by a battery, the electric power being supplied by a second electronic device adapted to be interconnected to the first electronic device through a bus interface, the method comprising:
monitoring a value of an input current received from the second electronic device through a voltage supply line of the bus interface;
generating a corresponding input current indication related to the value of the input current;
monitoring a value of a battery current supplied to the battery of the first electronic device;
generating a corresponding battery current indication related to the value of the battery current;
monitoring a value of a battery supply voltage supplied to the battery of the first electronic device;
generating a corresponding battery supply voltage indication related to the value of the battery supply voltage;
selecting the input current indication, the battery current indication, or the battery supply voltage indication to control a transfer of electric energy to the battery of the first electronic device through an electric energy storage element; and
increasing a charge time of an electric energy storage element, relative to a discharge time of the electric energy storage element, when the input current indication is selected and the value of the input current increases.

22. The method of claim 21, wherein monitoring the value of the input current includes monitoring when the value of the input current lower than a value of a sawtooth shaped reference signal, and wherein generating the corresponding input current indication includes creating a pulse width modulated signal with pulse widths that correspond to the periods when the value of the input current is lower than the value of the sawtooth shaped reference signal.

23. The method of claim 21, wherein selecting includes:
identifying which of the input current indication, the battery current indication, or the battery supply voltage indication has a shortest pulse width; and
selecting the identified indication to control the transfer of electric power to the battery of the first electronic device.

24. The method of claim 21, wherein the battery current indication is a pulse width modulated signal, a duty cycle of the battery current indication depends on the value of the battery current, and the duty cycle of the battery current indication increases if the value of the battery current is lower than a threshold battery current value.

25. A method for controlling a transfer of electric power to a first electronic device supplied by a battery, the electric power being supplied by a second electronic device adapted to be interconnected to the first electronic device through a bus interface, the method comprising:
monitoring a value of an input current received from the second electronic device through a voltage supply line of the bus interface;
generating a corresponding input current indication related to the value of the input current;
monitoring a value of a battery current supplied to the battery of the device;
generating a corresponding battery current indication related to the value of the battery current; and
controlling a transfer of electric energy from the voltage supply line, through an electric energy storage element, to the battery of the first electronic device based, at least in part, on the input current indication and/or the battery current indication,
wherein controlling the transfer of the electric energy comprises increasing a rate of energy transfer from the voltage supply line to the electric energy storage element when the value of the input current increases.

26. The method of claim 25, wherein the battery current indication is a pulse width modulated signal, a duty cycle of the battery current indication depends on the value of the battery current, and the duty cycle of the battery current indication increases if the value of the battery current is lower than a threshold battery current value.

27. The method of claim 25, wherein increasing the rate of energy transfer from the voltage supply line to the electric energy storage element comprises increasing a charge time of the electric energy storage element, relative to a discharge time of the electric energy storage element.

* * * * *

UNITED STATES PATENT AND TRADEMARK OFFICE
CERTIFICATE OF CORRECTION

PATENT NO. : 8,575,889 B2  
APPLICATION NO. : 12/200510  
DATED : November 5, 2013  
INVENTOR(S) : Platania et al.

It is certified that error appears in the above-identified patent and that said Letters Patent is hereby corrected as shown below:

In the Specification

Col. 6, line 16 should read:  
MPWM, it is possible to vary the charge and discharge time Signed and Sealed this  
Twenty-fourth Day of December, 2013

Margaret A. Focarino  
*Commissioner for Patents of the United States Patent and Trademark Office*